United States Patent Office 2,715,276
Patented Aug. 16, 1955

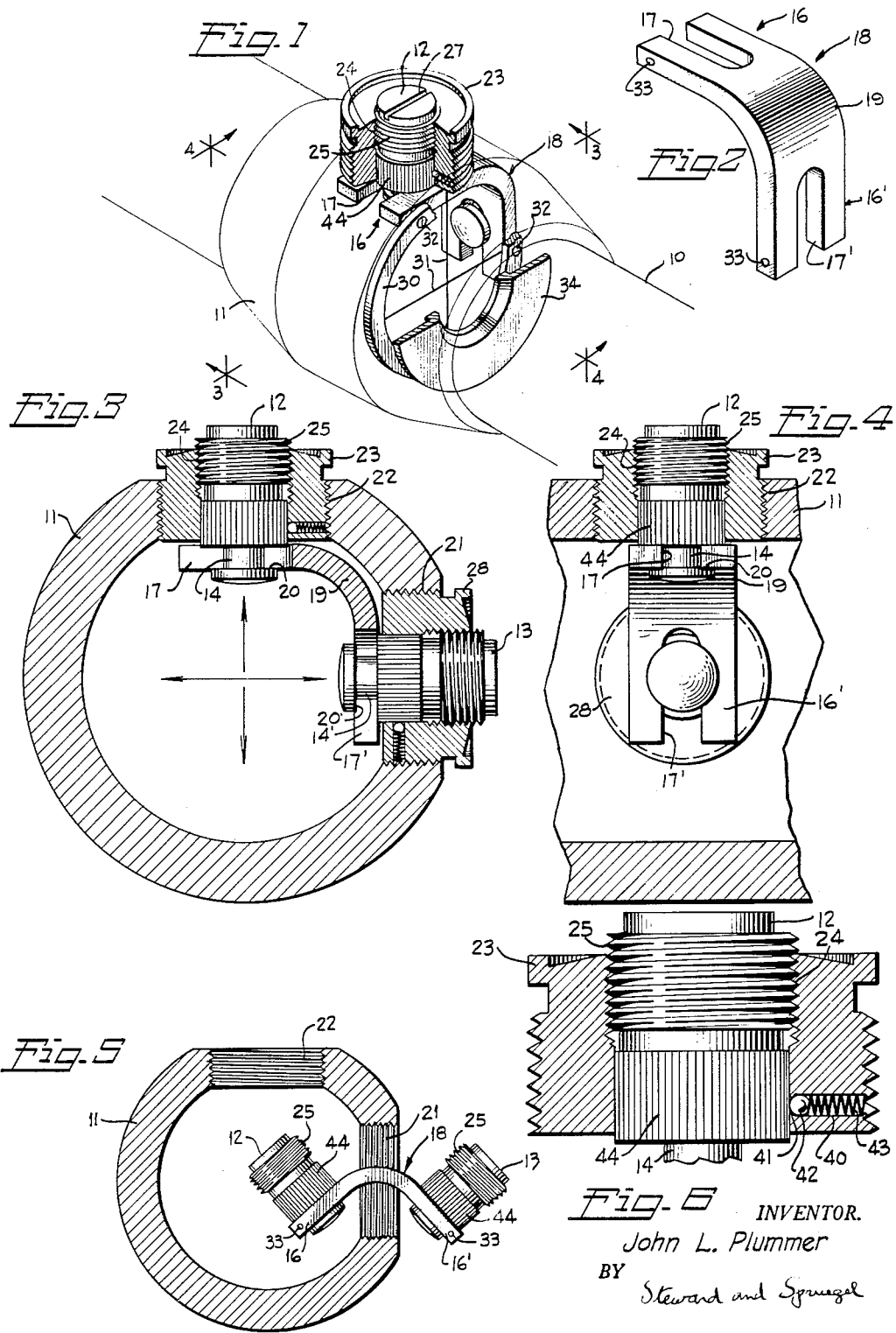

2,715,276

RETICULE HOLDER FOR TELESCOPIC GUN SIGHTS

John L. Plummer, Wynnewood, Pa., assignor to The Lyman Gun Sight Corporation, Middlefield, Conn., a corporation of Connecticut Application May 17, 1954, Serial No. 430,130

8 Claims. (Cl. 33—50)

This invention relates to telescopic gun sights, and more particularly to a novel method of supporting a reticule within a telescopic sight, in such manner that its position can be easily and accurately adjusted to correct for range and windage.

It is an object of this invention to provide an adjustable reticule mounting means in which the reticule is held firmly and positively against movement while the sight is in use.

It is another object of this invention to provide a simplified form of reticule mount which reduces the number of precision parts to a minimum without loss of accuracy in adjusting the device.

It is a further object of this invention to provide a reticule mount which dispenses with spring biasing means for holding the reticule.

In accordance with the present invention, the reticule is mounted on a quadrant member which has an arcuate center section, and which terminates in flat slotted ends at an angle of 90° to each other. A pair of adjustment screws, each having a zone of reduced diameter adjacent its end, are engaged with the quadrant member, the zones of reduced diameter being contained within the slots in the ends of the quadrant member. Motion of the quadrant member relative to the longitudinal axis of the adjustment screws is inhibited by the shoulders of the reduced diameter zone, which abut the quadrant member in slideable relationship thereto. The adjustment screws pass through threaded openings in the telescope mount housing, and are provided at their ends with a slot whereby they may be turned, as by engagement with a cartridge rim, to move them relative to the housing. When either adjustment screw is so moved, the quadrant and its associated reticule will be moved in the same direction as the screw, lateral motion of the quadrant being inhibited by the engagement of the quadrant member with the other of the adjustment screws.

In order that those skilled in the art may more fully comprehend the nature of the invention, and the method of carrying it out, it will be further described in connection with the accompanying drawings, in which Fig. 1 is a perspective view, partially cut away, of the novel reticule mount in position in a telescopic sight;

Fig. 2 is a perspective view of the quadrant member;

Fig. 3 is a vertical view partly in cross-section of the reticule mount taken along line 3—3 of Fig. 1;

Fig. 4 is a vertical view partly in cross-section of the mount taken along line 4—4 of Fig. 1;

Fig. 5 shows the reticule mount in process of assembly; and

Fig. 6 is a partial cross-section of one of the mounting plugs illustrating detent means for hindering rotation of the adjustment screws.

In assembling the reticule mount, telescope tube 10 is detached from mount housing 11, which may be affixed to a rifle by conventional means (not shown). Elevation and windage adjustment screws 12 and 13, which have zones of reduced diameter 14 and 14', are then mounted in the flat yoke section 16 and 16' of quadrant member 18, which, as may be observed, consists of a body section 19, bent at a 90° angle, and yoke sections 16 and 16' formed by cutting slots 17 and 17' in the flat ends of the quadrant member 18. The shoulders 20 of the reduced diameter zones 14 and 14' of screws 12 and 13 abut each surface of yoke sections 16 and 16', whereby to inhibit any motion of quadrant member 18 relative to the axis of adjustment screws 12 and 13, while random lateral motion is inhibited by contact of the wall of the reduced diameter zones 14 and 14' with the edges of slot 17 and 17'. Unidirectional lateral motion along the yoke sections 16 and 16' is, however permitted by this construction.

One end of quadrant member 18, with its associated adjustment screw 12, is then inserted through threaded opening 21 of mount housing 11 in the manner shown in Fig. 5. The quadrant member is then manipulated until the head of screw 12 projects through threaded opening 22 in mount housing 11. Mounting plug 23 is then screwed into threaded opening 22, while adjustment screw 12 is held to prevent rotation thereof, internal threads 24 on mounting plug 23 contacting threads 25 on the head of screw 12, whereby to allow screw 12 to be moved up and down in plug 23 by rotation thereof. Screw 12 is provided with a slot 27, into which a coin or cartridge rim may be inserted in order to turn the screw. Mounting plug 28 is then inserted into threaded opening 21 in the same manner to support adjustment screw 13 in movable relationship thereto, to assemble the mount as illustrated in Fig. 3. In this figure the adjustment screws are shown in the position in which they would be when correcting for extreme range and extreme right windage.

Reticule ring 30, with its associated cross-hairs 31 is then mounted on quadrant member 18, as by screws 32 passing through ring 30 and into threaded holes 33 in quadrant member 18. Telescope tube 10, with its associated diaphragm 34, is then reattached to mount housing 11.

It will be observed that the reticule ring may be moved laterally by rotation of windage adjustment screw 13, in which case quadrant member 18 is guided in a straight line in the direction of the horizontal arrow in Fig. 3 by the shoulders 20 of reduced diameter zone 14 of elevation adjustment screw 12 in contact with yoke section 16, thus assuring that no vertical motion of reticule cross hairs 31 will take place during an adjustment for windage. Similarly, when adjusting for range by rotation of elevation adjustment screw 12, quadrant member 18 is guided in a straight vertical line indicated by the vertical arrow in Fig. 3 by the shoulders 20' of windage adjustment screw 13, in contact with yoke section 16', to prevent any lateral motion of cross-hairs 31. It will also be observed that the motion of reticule ring 30 is rectilinear at all times, and it is maintained at all times in the same plane longitudinally of the telescope, and also held against rotation.

While the construction hereinbefore described provides a sturdy and reliable reticule mount, in accordance with a further feature of this invention, means are provided for eliminating backlash of the adjustment screws, and for enabling the shooter to estimate the amount of correction which he is obtaining when turning one of the adjustment screws. Such means more particularly illustrated in Fig. 6 comprise a hole 40 bored through each of the mounting plugs 23 and 28, the hole having a constricted lip 41 at the inner end thereof and a ball 42, placed in the hole 40, the ball 42 having a diameter such that it is freely movable in hole 40, but will not pass through constricted lip section 41. A portion of the ball 42 will, however, project from lip 41 into the interior of the mounting plug. Spring 43 is then slipped into hole 40, and while spring 43 is held under compression, the material of the mounting plug adjacent the outer end of hole 40 is sufficiently deformed to hold the spring 43 in place in hole 40. Now, when an adjustment screw is rotated, the ball 42 will be urged by spring 43 into contact with serrations 44 on the body of the adjustment screw, and as each serration 44 passes the ball 42, an audible click will be produced, whereby the shooter may estimate the degree of correction. Pressure of ball 42 against serrations 44 also eliminates backlash and guards against accidental turning of the adjustment screws.

It will thus be apparent that the reticule mount of the present invention is sturdy, reliable, and simple to manufacture and assemble. In contrast to mounts of the prior art, no extensive machining to close tolerances is required. In fact, the only place in which fine machining is required is in the formation of reduced diameter zones 14 and 14′, which should be so finished that the shoulders 20 and 20′ will closely contact the upper and lower surfaces of yoke sections 16 and 16′ and the walls thereof will make close contact with the edge of slots 17 and 17′.

What is claimed is:

1. A reticule mount for a telescopic gun sight including in combination a quadrant member having straight end sections extending at an angle of 90° to each other, and an adjustment screw member carried by each end of said quadrant member, said adjustment screw and quadrant members being respectively connected for limited sliding movement relative to each other, one of said members having a slot within which a portion of the other member is slidably engaged, and opposed parallel surfaces defined by said slot and said slidably engaged portion, respectively, which surfaces abut to confine the relative motion between said members to movement longitudinally of the respective straight end sections of said quadrant member.

2. A reticule mount for a telescopic gun sight including in combination a quadrant member having straight end sections extending at an angle of 90° to each other, a slot in each end section parallel to the sides thereof, and an adjustment screw carried by each end section, the said adjustment screws having a reduced diameter section and shoulders adjacent said reduced diameter section, the said shoulders being in slidable contact with the opposed surfaces of the said end sections, and the wall of the reduced diameter section being in slidable contact with the edges of the slots.

3. A reticule mount for a telescopic gun sight including in combination a telescope mount housing, a first opening in the mount housing, a second opening in the mount housing at an angle of 90° to the first opening, each opening being supplied with internal threads, a pair of adjustment screws passing through the said openings, external threads on each adjustment screw adjacent the head thereof in engagement with the internal threads of the openings, a reduced diameter section, with shoulders adjacent the ends thereof, on each adjustment screw, and a quadrant member carried by said adjustment screws, said quadrant member having straight end sections extending at an angle of 90° to each other, and a slot in each end section parallel to the sides thereof, the said shoulders of each adjustment screw being in slidable contact with the opposed surfaces of one of the end sections, and the wall of the reduced diameter section of each adjustment screw being in slidable contact with the edges of the slot in one of the end sections.

4. A reticule mount for a telescope gun sight including in combination a telescope mount housing having two threaded openings therein at an angle of 90° from each other, a threaded adjustment screw extending through each opening, the threads of the openings being in engagement with the screw threads of the adjustment screw, each of the said adjustment screws having a reduced diameter section with shoulders adjacent the ends thereof, and a quadrant member within the mount housing carried by said adjustment screws, said quadrant member having straight end sections extending at an angle of 90° from each other and a slot in each end section parallel to the sides thereof, the shoulders of one of the adjustment screws being in slidable contact with the opposed surfaces of one of the end sections, with the wall of the reduced diameter section in slidable contact with the edges of the slot, the shoulders of the other of the adjustment screws being in slidable contact with the opposed surfaces of the other end section, with the wall of the reduced diameter section in slidable contact with the walls of the slot.

5. A reticule mount for a telescopic gun sight according to claim 4, including a reticule ring attached to the quadrant member and a pair of cross hairs carried by the reticule ring, one of said hairs having its axis parallel to the axis of one of said adjustment screws, the other cross hair having its axis parallel to the axis of the other of said adjustment screws.

6. A reticule mount according to the claim 5 including detent means for hindering rotation of the adjustment screws.

7. A reticule mount for a telescopic gun sight including in combination a telescope mount housing having two circular threaded openings therein at an angle of 90° to each other, a mounting plug fitted into each of said openings, said mounting plug having external threading in engagement with the threads of the openings, a central bore in each mounting plug, internal threading over a portion of the length of the bore adjacent the outer end thereof, an adjustment screw extending through the central bore of each mounting plug, each of said adjustment screws having a threaded head portion, a serrated body portion, and a reduced diameter portion having shoulders at each end thereof, the threads of the head portion being engaged with the internal threading of the bore, a port in each mounting plug extending therethrough opposite the serrated body portion of the adjustment screw, the said port having a constricted inner lip, a ball of larger diameter than the inner lip carried within the port, spring means for biasing the ball in a position such that at least a portion of the ball extends through the inner lip and contacts the serrated body portion of the adjustment screw, and a quadrant member within the mount housing carried by the adjustment screws, said quadrant member having straight end sections extending at an angle of 90° to each other, and a slot in each end section parallel to the sides thereof, the shoulders of one of the adjustment screws being in slidable contact with the opposed surfaces of one of said end sections, with the wall of the reduced diameter portion in slidable contact with the edges of its slot, and the shoulders of the other adjustment screw being in slidable contact with the opposed surfaces of the other end section, with the wall of the reduced diameter portion in slidable contact with the edges of the slot.

8. A reticule mount according to claim 7, including a reticule ring attached to the quadrant member, and a pair of cross hairs carried by the reticule ring, one of said hairs having its axis parallel to the axis of one of said adjustment screws, and the other cross hair having its axis parallel to the axis of the other of said adjustment screws.

References Cited in the file of this patent

UNITED STATES PATENTS

| 618,161 | Brightmore | Jan. 24, 1899 |
| 2,078,858 | Kuhn | Apr. 27, 1937 |
| 2,189,766 | Unertl | Feb. 13, 1940 |